United States Patent [19]

Torti et al.

[11] Patent Number: 4,618,391
[45] Date of Patent: Oct. 21, 1986

[54] AUTOMATIC DEVICE FOR BRINGING INTO REGISTER A TOOL MOUNTED ON A ROTARY CYLINDER FOR PROCESSING PRODUCTS IN SHEET FORM

[75] Inventors: Mario Torti, Lyons; Emilio Fernandez, Bron, both of France

[73] Assignee: S. A. Martin, Villeurbanne, France

[21] Appl. No.: 636,763

[22] Filed: Aug. 1, 1984

[30] Foreign Application Priority Data

Aug. 18, 1983 [FR] France .............................. 83 13577

[51] Int. Cl.⁴ .............................................. B26D 5/20
[52] U.S. Cl. .................................... 156/353; 156/364; 156/384; 156/510; 83/74; 83/75; 83/76; 83/298; 271/203; 271/227; 271/229; 271/259; 271/261
[58] Field of Search ............... 156/353, 364, 384, 510; 271/227, 229, 256, 258, 259, 261, 202, 203; 83/74, 75, 76, 298

[56] References Cited

U.S. PATENT DOCUMENTS

| | | | |
|---|---|---|---|
| 3,522,129 | 7/1970 | Crathern | 156/364 |
| 3,827,688 | 8/1974 | Luffy et al. | 271/203 |
| 4,070,226 | 1/1978 | Crathern et al. | 156/364 |
| 4,091,315 | 5/1978 | Hayashi et al. | 83/76 |
| 4,438,917 | 3/1984 | Janssen et al. | 271/227 |
| 4,464,959 | 8/1984 | Larson | 83/76 |

Primary Examiner—Caleb Weston
Attorney, Agent, or Firm—Pollock, Vande Sande & Priddy

[57] ABSTRACT

Device for bringing into register a tool mounted on a rotary cylinder for processing products in sheet form, such as a tool for cutting out, creasing, or printing sheets of cardboard in a machine for making and printing corrugated cardboard boxes, comprising a coder (22) providing information representing the theoretical advance of the sheets (10, 11), a coder (23) providing information representing the angle of adjustment given to the tool holder (1), a detector (20) of the passage of a reference mark (15) on the sheet (11) to a point situated upstream of the tool holder, a detector (36) of the theoretical passage of this reference mark at a selected distance slightly downstream of the first detector (20), and a computer (33) supplying correction commands to the correction motor (8) of the tool holder in order that the tool will arrive in phase with the incident sheet (11).

1 Claim, 2 Drawing Figures

AUTOMATIC DEVICE FOR BRINGING INTO REGISTER A TOOL MOUNTED ON A ROTARY CYLINDER FOR PROCESSING PRODUCTS IN SHEET FORM

FIELD OF THE INVENTION

The present invention relates to a device for bringing into register a tool mounted on a rotary cylinder for processing products in sheet form, e.g., a tool for cutting out, crush-creasing or printing sheets of cardboard in a machine for making and printing corrugated cardboard boxes.

BACKGROUND OF THE INVENTION

In the corrugated cardboard industry, particularly in the making and printing of packing boxes, use is normally made of rotary cutting-out and printing machines consisting of two cylinders operating in the manner of a rolling mill. A rotary cutter, for example, comprises two superposed cylinders turning in opposite directions and at the same circumferential speed. On one of the cylinders, known as the "tool holder", are fastened cutting-out tools consisting of cutting rules generally fitted into sockets formed in a plywood shell matching the shape of the cylinder. The second cylinder, called "cutting counterpart", is given a plastic coating, often of polyurethane. A conventional eccentric bearing adjustment device makes it possible to vary the distance between these two cylinders in order to obtain the necessary cutting pressure whatever the thickness of the cardboard being worked.

The tool holder cylinder and the counterpart cylinder are both rotated by means of gears designed to ensure that the circumferential speed of the tool corresponds to that of the plastic counterpart. These two cylinders are connected to the general kinematics of the processing machine, more particularly to its cyclic sheet feed device, by means of a planetary gear train in which the satellite carrier is rotationally connected to a braking motor-reduction gear unit. The action of this motor-reduction gear unit then enables the user to offset the cutter angularly relative to the general kinematics, so as to bring the tool into phase with the sheet which is to be cut.

In these known arrangements, in which the feed device introduces one sheet after the other at constant intervals theoretically equal to the development of the tool holder, i.e., one sheet for each revolution of the tool holder, the accuracy of the arrival of the sheets in the cutter is generally insufficient for the accuracy required in respect of the position of the cuts in relation to the ends of the sheet.

Some of the sheets of cardboard introduced into the feed magazine of the machine are in fact flat, while others are slightly curved, so that the clearance in the magazine varies from one sheet to another and the sheets may be slightly displaced from the outset. Furthermore, one or more printing machines are generally interposed between the cutter and the feed device, and random slippage may occur on the drive rollers of these interposed machines, thus further reducing the accuracy of transfer of the cardboard sheets. With devices of this kind, the sheets are not presented strictly in phase with the cutting cylinders within the limits of the required precision. It is then generally necessary to make additional front and rear end cuts by means of the rotary cutter, thus necessitating the use of additional blades, and a sheet larger than necessary, resulting in relatively considerable wastage.

SUMMARY OF THE INVENTION

The device according to the invention makes it possible to avoid these end cuts and the consequent wastage. With the aid of this device, in fact, the tool will be presented for the cutting operation in perfect synchronism with the sheets, i.e., perfectly "in register".

What has just been said is obviously also applicable to the rotary printing machines, for which it is necessary that the printing should be effected at the required position on each box. The device according to the invention, whose task is to adjust the position of the tool so that the latter will be strictly in phase with the incident sheet, is called in the terms of the trade a "device for bringing into register".

The invention is applicable to a rotary processing installation of the type comprising a device for the cyclic feeding of the sheets to the processing unit proper, which comprises a tool holder cylinder provided with tools, for example for cutting or printing, and a counterpart cylinder, the whole being driven by one and the same general kinematic chain, which is so designed that the interval of the introduction of the successive sheets will correspond to the development of the tool holder cylinder, or to a multiple thereof, while the drive of the tool holder cylinder comprises a device for angular adjustment relative to the general kinematic chain under the control of an adjusting motor.

According to the invention, the device further comprises:

a first coding device connected to the general kinematic chain and supplying information representing the theoretical speed of advance of the sheets, a second coding device connected to the adjustment device and providing information representing the adjustment value given to the tool holder relative to the general kinematic chain, a first detector of the passage of a selected reference mark on the sheet, this detector being disposed upstream of the tool holder cylinder at a distance less than the development of the latter, a second detector coupled to the general kinematic chain and providing electric pulses linked to the feed cycle of the sheets, a computing and correction unit receiving and analyzing the information provided by the detector and coding devices and accordingly providing for each cycle of the machine one or more correction commands to the tool holder adjustment device in response to the difference between the actual position of the sheet introduced and its theoretical position.

BRIEF DESCRIPTION OF THE DRAWINGS

The invention will be better understood with the aid of the following description of a non-limitative example of embodiment applied to an installation for cutting out corrugated cardboard blanks, given with reference to the accompanying drawings, in which.

DESCRIPTION OF A PREFERRED EMBODIMENT

Figure 1:
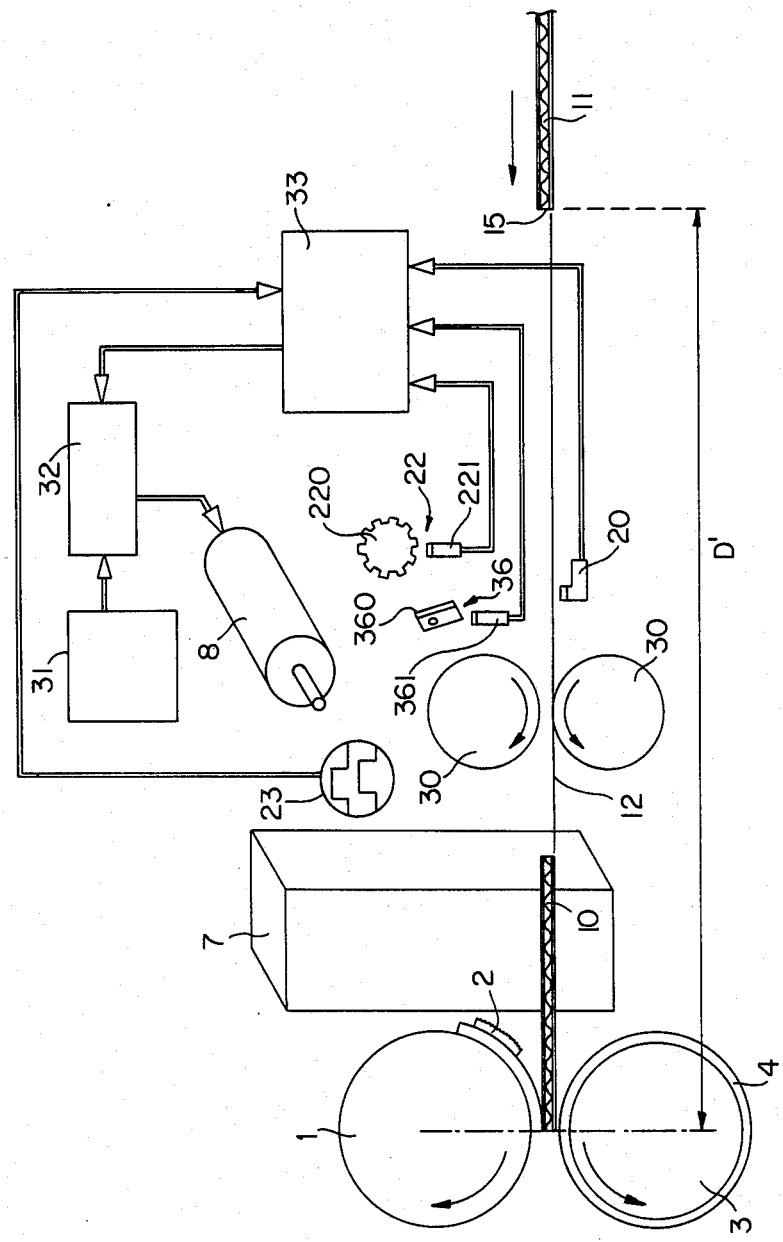
FIG. 1 shows diagrammatically an installation for cutting out cardboard blanks, equipped with the device for bringing into register according to the invention.

In FIG. 1, the reference 1 designates the tool holder cylinder provided with the cutting tool 2, and the reference 3 designates the associated counterpart cylinder, with its plastic counterpart 4. The cylinders 1 and 3 turn in opposite directions at the same peripheral speed, in the directions of the arrows. In conventional manner for this type of device, the cylinders 1 and 3 are driven from the general kinematic chain of the machine by means of gears, (not shown), and via a differential system 7, described further on, driven by a motor-reduction gear unit 8. The motor 8 enables the cutting unit 1,3 to be adjusted at the front or rear relative to the general kinematic chain in order to enable presentation of the tool 2 in phase with the sheets being cut.

The blanks 10, 11 which are to be cut pass in sequence in a horizontal plane 12, as indicated by the arrow in the drawing, being driven, inter alia, by a pair of drive cylinders 30 connected to the general kinematic chain, and are spaced apart by an actual distance D' close to the geometrical development D of the tool holder cylinder 1. The difference D-D', either positive or negative, results from accidental displacements undergone by the sheets after they have left the feed magazine. It is here assumed that the first sheet 10 arrives correctly in phase with the tool 2. The second sheet 11 has its front end 15 situated at the actual distance D' from that of the sheet 10, D' being slightly different, either positively or negatively, from the theoretical distance D.

According to the invention, for the purpose of bringing the sheet 11 and the cutting tool 2 back into phase, i.e., effecting the "bringing into register" of the latter, the installation is provided with additional means, to be described below.

A detector 20, consisting in the example under consideration of a photoelectric cell, is situated upstream of the cylinder 1, at a distance from the latter shorter than the geometrical development D of the cylinder. The cell 20 produces a signal every time the front end of a blank passes in front of it.

A pulse generator 22, consisting of a coding wheel 220 and a proximity detector 221, is mounted on the shaft of one of the drive cylinders 30, and is therefore connected to the general kinematic chain of the machine. It supplies a train of pulses of a frequency proportional to the speed of the general kinematic chain and therefore proportional to the theoretical speed of advance of the sheets.

A pulse generator 23 connected to the output of the motor-reduction gear unit 8 supplies information concerning the direction and the value of the adjustment made by the action of the motor 8 on the differential 7.

A detector 36, composed of a finger 360 centered on the axis of the cylinder 30 and turning with the latter and of a proximity detector 361, provides a pulse on each theoretical passage of a sheet correctly fed at a selected distance, for example 7 mm, downstream of the cell 20. This pulse is therefore linked to the feed cycle of the sheets; its appearance is adjusted to the desired moment of time by displacement of the detector 361.

An electronic computer 33, equipped in particular with a reversible counter, with comparators, and with a command generator, has the task of grouping together and analyzing, in the manner which will be explained further on, the information supplied to it by the detectors 36 and 20 and by the pulse generators 22 and 23, and of supplying accordingly a correction signal to the motor-reduction gear unit 8, as indicated by the corresponding connections in the drawing. This computer 33 may be of an entirely ordinary type, easily constructable from elements available on the market, its functions being as explained below; it will therefore not be described here in greater detail, since its construction will be familiar to those skilled in the art and will entail for the latter only routine operations, which in themselves are entirely outside the scope of the invention. A computer unit of this kind can moreover be supplied directly ready for use by manufacturers if they are first advised of the desired functions.

The correction commands are given to the motor 8 through a variator 32, which the operator can control manually with the aid of a conventional manual control 31.

Figure 2:
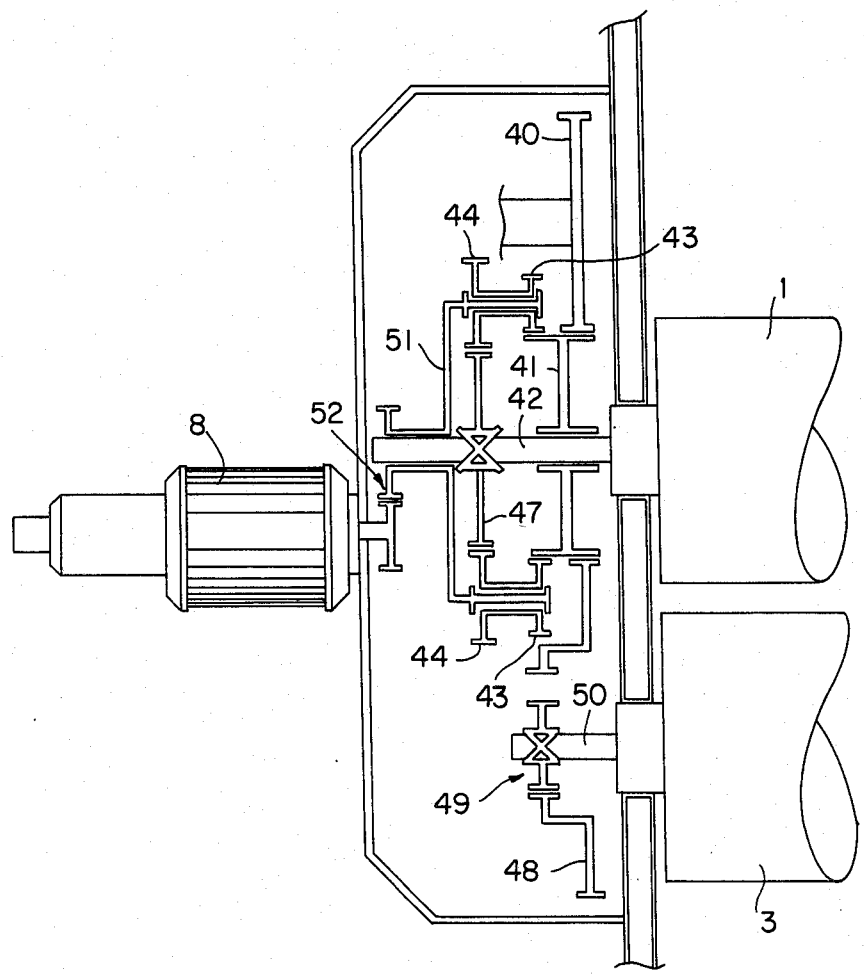
FIG. 2 shows diagrammatically the differential device known per se with which the installation shown in FIG. 1 is equipped.

The differential device 7 used in the arrangement shown in FIG. 1 is of the type shown diagrammatically in FIG. 2. A device of this kind is known per se, and therefore does not form part of the invention.

Under normal operating conditions, a gear 40 is driven by the general kinematic chain of the machine and drives the gear 41 mounted loose on the shaft 42 of the tool holder cylinder 1. The gear 41 drives the satellites 43–44, the gears 44 driving the shaft 42 rotationally by means of the gear 47.

The gear 41 meshes drivingly with a gear 48, which in turn drives the shaft 50 of the bottom cylinder 2 through an eccentric 49 intended for the adjustment of the distance between the cylinders 1 and 2. All these gears are dimensioned to ensure that the cylinders 1 and 2 turn at the same peripheral speed.

The satellite carrier 51 is mounted loose on the shaft 42 and meshes with the shaft of the motor 8 through a pair of pinions 52.

The differential device shown in FIG. 2 functions in the following manner:

If the motor 8 is turned momentarily, the gear 52, and with it the satellite carrier 51, is turned through a certain angle. Relative to the pinions 40, 41, 48, the satellites 43, 44 then turn through the same angle, thereby, with the aid of the pinion 47, adjusting the shaft 42 and consequently the cylinder 1 relative to the cylinder 2.

The functioning of the device shown in FIG. 1 is as follows:

Before commencing the operation of achieving automatic register, the operator starts by setting the register manually.

He therefore places the unit 31 in the "manual" position and operates sheet by sheet to set the register.

Each time the front end 15 of a sheet 11 passes over the cell 20, the computer 33 starts to count the pulses of a time base whose period is 1 microsecond.

When the proximity detector 361 is activated, i.e., theoretically 7 mm after the end 15 has passed over the cell 20, the counter is stopped and its value (t) is recorded. Simultaneously, the value of the speed V of the machine, supplied by the pulse generator 22, is read. The computer 33 then proceeds to calculate the actual distance x = Vt travelled by the end 15 since its passage over the cell 20.

This operation is repeated for each sheet without the operator, who is still operating manually, having to take this into account.

When the operator considers that the cutting is in correct register, i.e., that at least the last sheet has reached the cutter correctly, he interrupts manual adjustment and changes over to the "automatic" position.

The computer then records as reference the value $x_{ref} = Vt$ relating to the last sheet (or, if preferred, to the mean of a few of the last sheets all assumed to have been in correct register).

For each subsequent sheet 11, the computer still measures the value $x = Vt$ defined above, but this time it compares this value with the reference value $x_{ref}$ and deduces therefrom the forward or rearward correction to be made, with the aid of the motor 8 and the differential 7, to the tool holder 1 to ensure that the sheet 11 will arrive exactly in phase with the correct cut. The operation stops when the coder 23 indicates to the computer 33 that the motor 8 has turned sufficiently.

It will be observed that, if the next sheet fails to arrive, the cell 20 will not transmit a signal, thus eliminating the risk of inappropriate correction, and the next passage of a reference mark 15 in front of the detector 17 will restart a new cycle for the next sheet, if there is one, and so on. It will be noted that the distance C between the cell 20 and the tool holder 1 will be determined in dependence on the speed of operation of the motor 8, so that the latter will have time to make the necessary correction while the new sheet is travelling through the distance C. In practice, the distance C will often be close to D/2. Moreover, it is possible to introduce a set value for maximum correction, in order to prevent a sheet which has undergone excessive displacement from calling for a correction which it is impossible to make and impairing the correction of the following sheet.

It is also possible to introduce a set value for delay in correction if the difference between the development D and the maximum length L of the sheets introduced is lower than the distance C. This set value will correspond to the distance $C-(D-L)$. In this way, the correction will not be made before the preceding sheet has passed beyond the cutting axis. The displacement of the tool while it is engaged in the cardboard will thus be avoided, except for very large formats, for which the adjustment will be made at the end of the preceding sheet. In addition, instead of detecting the front end 15 of the new sheet 11, it would also be possible to detect any reference mark provided on the sheet, for example a reference mark printed by an upstream printing machine, the position of which is equally characteristic of the exact position of the sheet relative to the tool holder cylinder.

We claim:

1. Apparatus for achieving automatic register for a processing installation for products in sheet form, which utilizes a rotary cylinder and comprising means for the cyclic feeding of sheets to a tool holder cylinder (1) driven by the general kinematic chain of a machine in such a manner that the interval of introduction of the successive sheets corresponds to the development of the tool holder, or to a multiple thereof, the drive of the tool holder cylinder comprising a device (7) for angular adjustment, relative to the general kinematic chain, under the control of an adjusting motor, said apparatus comprising
   (a) a first coding device (22) connected to the general kinematic chain (30) and supplying information representing the theoretical speed of advance of the sheets;
   (b) a second coding device (23) connected to the adjustment device (8) and providing information representing the angular adjustment value given to the tool holder;
   (c) a first detector (20) of the passage of a selected reference mark (15) on the sheet, this detector being disposed upstream of the tool holder cylinder at a distance less than the theoretical distance between two successive sheets;
   (d) a second detector (36) coupled to the general kinematic chain (30) and providing electric pulses linked to the feed cycle of the sheets; and
   (e) a computing and correction unit receiving and analyzing the information provided by said first and second detectors (20, 36) and coding devices (22, 23) and accordingly providing for each cycle of said machine one or more commands for the correction of the tool holder in response to the difference between the actual position of the sheet introduced and its theoretical position.

* * * * *